United States Patent
Liu et al.

(10) Patent No.: US 9,959,044 B2
(45) Date of Patent: May 1, 2018

(54) MEMORY DEVICE INCLUDING RISKY MAPPING TABLE AND CONTROLLING METHOD THEREOF

(71) Applicant: MACRONIX INTERNATIONAL CO., LTD., Hsinchu (TW)

(72) Inventors: Ting-Yu Liu, Hsinchu (TW); Nai-Ping Kuo, Hsinchu (TW); Yi-Chun Liu, Zhubei (TW); Jian-Shing Liu, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 81 days.

(21) Appl. No.: 15/145,504

(22) Filed: May 3, 2016

(65) Prior Publication Data

US 2017/0322735 A1    Nov. 9, 2017

(51) Int. Cl.
| G06F 12/00 | (2006.01) |
| G06F 13/00 | (2006.01) |
| G06F 13/28 | (2006.01) |
| G06F 3/06 | (2006.01) |
| G06F 12/1009 | (2016.01) |

(52) U.S. Cl.
CPC .......... *G06F 3/0605* (2013.01); *G06F 3/065* (2013.01); *G06F 3/068* (2013.01); *G06F 3/0619* (2013.01); *G06F 3/0659* (2013.01); *G06F 12/1009* (2013.01); *G06F 2212/1032* (2013.01); *G06F 2212/152* (2013.01); *G06F 2212/657* (2013.01)

(58) Field of Classification Search
CPC ...... G06F 3/0605; G06F 3/0619; G06F 3/065; G06F 3/0659; G06F 12/1009; G06F 2212/1032; G06F 2212/152; G06F 2212/657; G06F 3/068
USPC .......................................................... 711/202
See application file for complete search history.

(56) References Cited

U.S. PATENT DOCUMENTS

| 6,026,476 | A  | * | 2/2000  | Rosen ............... G06F 12/1027 |
|   |   |   |   | 711/205 |
| 8,074,272 | B2 | * | 12/2011 | Choi ..................... G06F 21/577 |
|   |   |   |   | 726/17 |
| 9,646,275 | B2 | * | 5/2017  | Nielsen .............. G06Q 10/0635 |
| 2004/0054867 | A1 | * | 3/2004 | Stravers .............. G06F 12/1027 |
|   |   |   |   | 711/207 |
| 2005/0144114 | A1 | * | 6/2005 | Ruggieri .............. G06Q 40/025 |
|   |   |   |   | 705/37 |
| 2005/0187825 | A1 | * | 8/2005 | Kirkley .................. A47F 9/046 |
|   |   |   |   | 705/18 |
| 2007/0016954 | A1 | * | 1/2007 | Choi ..................... G06F 21/554 |
|   |   |   |   | 726/25 |
| 2007/0032929 | A1 | * | 2/2007 | Yoshioka .............. G07C 5/008 |
|   |   |   |   | 701/33.4 |
| 2007/0276996 | A1 | * | 11/2007 | Caulkins ................. G06F 3/061 |
|   |   |   |   | 711/113 |

(Continued)

*Primary Examiner* — Sheng-Jen Tsai
(74) *Attorney, Agent, or Firm* — Finnegan, Henderson, Farabow, Garrett & Dunner LLP (57) ABSTRACT

A memory device includes a first storage unit storing an address mapping table, and a control unit coupled to the first storage unit and including a second storage unit storing a risky mapping table and a cached mapping table. The control unit is configured to: write data into the first storage unit; update mapping information associated with the data in the risky mapping table; and store mapping information in the cached mapping table into the address mapping table.

18 Claims, 10 Drawing Sheets

(56) References Cited

U.S. PATENT DOCUMENTS

| | | | |
|---|---|---|---|
| 2010/0332730 A1* | 12/2010 | Royer, Jr. | G06F 12/0246 711/103 |
| 2012/0096226 A1* | 4/2012 | Thompson | G06F 12/121 711/136 |
| 2013/0111116 A1* | 5/2013 | Inada | G06F 12/02 711/103 |
| 2013/0198439 A1* | 8/2013 | Kurotsuchi | G06F 12/0246 711/103 |
| 2014/0025921 A1* | 1/2014 | Yuan | G06F 12/1009 711/206 |
| 2014/0089568 A1* | 3/2014 | Chung | G06F 12/0246 711/103 |
| 2014/0095770 A1* | 4/2014 | Huang | G11C 11/5642 711/103 |
| 2014/0181376 A1* | 6/2014 | Miyamoto | G06F 12/0246 711/103 |
| 2014/0236656 A1* | 8/2014 | Nielsen | G06Q 10/06 705/7.17 |
| 2014/0304453 A1* | 10/2014 | Shao | G06F 12/0246 711/103 |
| 2015/0347026 A1* | 12/2015 | Thomas | G06F 3/0611 711/103 |
| 2015/0347041 A1* | 12/2015 | Kotte | G06F 3/0616 711/103 |
| 2015/0347296 A1* | 12/2015 | Kotte | G06F 12/0269 711/103 |
| 2016/0042305 A1* | 2/2016 | Tsai | G06Q 10/0635 705/7.28 |
| 2016/0217030 A1* | 7/2016 | Shin | G06F 11/085 |
| 2017/0068621 A1* | 3/2017 | Watanabe | G06F 12/0891 |

* cited by examiner

MEMORY DEVICE INCLUDING RISKY MAPPING TABLE AND CONTROLLING METHOD THEREOF

FIELD OF THE DISCLOSURE

The present disclosure relates to a memory device and operation method of the same and, more particularly, to a memory device including a risky mapping table.

BACKGROUND

A non-volatile memory device is a semiconductor device capable of continuously storing data even when the supply of electricity is removed. The operation of the non-volatile memory typically includes writing data to an unused physical location in the non-volatile memory. In order to effectively track the physical location of the data in the flash memory, an address mapping table is stored in the non-volatile memory to store a mapping relationship between a logical address of the data usable by an external system and a physical address of the data usable by the non-volatile memory.

SUMMARY

According to an embodiment of the disclosure, a memory device includes a first storage unit storing an address mapping table, and a control unit coupled to the first storage unit and including a second storage unit storing a risky mapping table and a cached mapping table. The control unit is configured to: write data into the first storage unit; update mapping information associated with the data in the risky mapping table; and store mapping information in the cached mapping table into the address mapping table.

According to another embodiment of the disclosure, a method for controlling a memory device by a control unit is provided. The memory device includes a first storage unit. The control unit includes a second storage unit. The method includes: writing data into the first storage unit; updating mapping information associated with the data in a risky mapping table included in the second storage unit; and storing mapping information in a cached mapping table included in the second storage unit into an address mapping table included in the first storage unit.

The accompanying drawings, which are incorporated in and constitute a part of this application, illustrate disclosed embodiments and, together with the description, serve to explain the disclosed embodiments.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Figure 1:
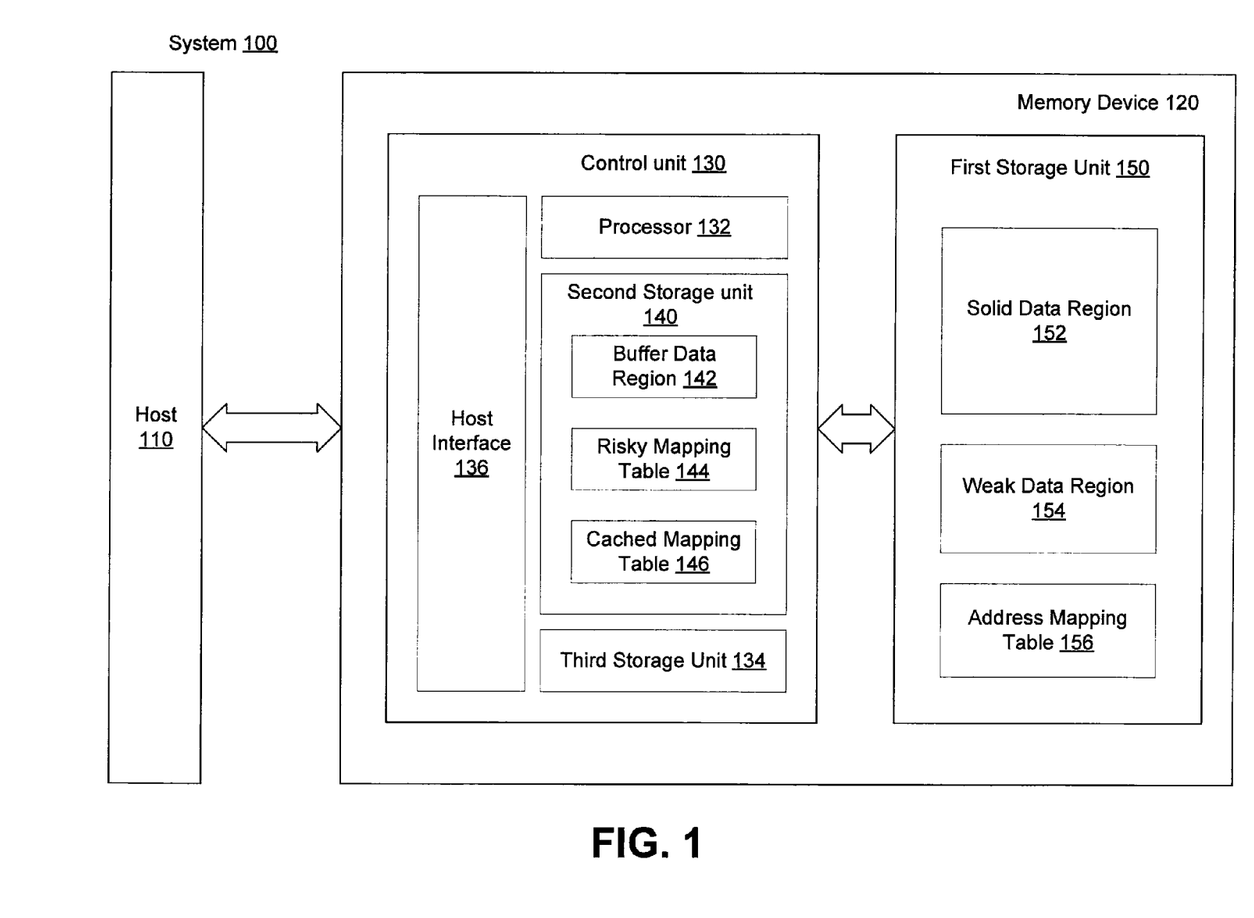
FIG. 1 is a block diagram of a memory system according to an illustrated embodiment.

FIG. 1 is a block diagram of a system 100 according to an illustrated embodiment. Referring to FIG. 1, system 100 includes a host 110 and a memory device 120.

Host 110 is a device that sends various control commands, such as a read command, a write command, and an erase command, to memory device 120. Examples of host 110 include portable electronic devices such as mobile phones, MP3 players, digital camera, and lap-top computers, or electronic devices such as desktop computers, game machines, TVs, projectors, and vehicle entertainment systems.

Memory device 120 includes a control unit 130 and a first storage unit 150, provided as a non-volatile memory, communicatively coupled to control unit 130. Control unit 130 includes a processor 132, a second storage unit 140, a third storage unit 134, and a host interface 136. Processor 132 is configured to control overall operations of memory device 120. Processor 132 can be implemented as a general-purpose processor configured to execute various computer program instructions to control operations of memory device 120. In an alternative embodiment, control unit 130 can include special-purpose logic circuits that are configured to control operations of memory device 120.

Third storage unit 134 is configured to store the computer program instructions executed by processor 132. Third storage unit 134 is also figured to store various information such as, for example, paired page relationships which will be described below, used by processor 132 to control operations of memory device 120. Third storage unit 134 can be implemented as a non-volatile memory.

Host interface 136 is configured to receive various control commands and data from host 110, and transfer the control commands to processor 132 and data to buffer data region 142. Host interface 136 is also configured to receive data from buffer data region 142, and transfer the data to host 110.

Second storage unit 140 can be provided as a volatile memory or a non-volatile memory. Second storage unit 140 is configured to temporarily store program instructions or information loaded from third storage unit 134 or first storage unit 150, to be used by processor 132 to control operations of memory device 120. Second storage unit 140 can be implemented as a fast random-access memory such as a dynamic random-access memory (DRAM), a static random-access memory (SRAM), or a phase change memory (PCM). Second storage unit 140 includes a buffer data region 142 for temporarily storing data received from host 110 and to be written into first storage unit 150 during a write operation, and temporarily storing data read from first storage unit 150 to be transferred to host 110 during a read operation. Second storage unit 140 also stores a risky mapping table 144 including logical-to-physical address mapping information (hereinafter referred to as "mapping information") of risky data stored in first storage unit 150 and risky data stored in buffer data region 142. Risky data is data that can be damaged by a sudden interruption of power supplied to memory device 120. A further explanation regarding the risky data will be provided below with reference to FIGS. 2A-2D. Second storage unit 140 further stores a cached mapping table 146 including logical-to-physical address mapping information loaded from first storage unit 150. A size of risky mapping table 144 is smaller than a size of cached mapping table 146.

First storage unit 150 includes a plurality of memory cells that can be programmed to store data supplied from an external device such as, for example, host 110. First storage unit 150 includes a solid data region 152 and a weak data region 154. Explanations regarding solid data region 152 and weak data region 154 will be provided with reference to FIGS. 2A-2D. First storage unit 150 also stores an address mapping table 156 that includes logical-to-physical address mapping information of data stored in first storage unit 150.

First storage unit 150 can be a NAND flash memory consisting of a plurality of memory cells. Each memory cell can be a multi-level cell (MLC) that can store two bits of data in two program cycles. Alternatively, each memory cell can be a triple-level cell (TLC) that can store three bits of data in three program cycles. Still alternatively, each memory cell can store more than three bits of data in more than three program cycles.

The data stored in the memory cells are further arranged into a plurality of blocks, and each block includes a plurality of pages. The plurality of pages are paired with each other to form sets of paired pages, with each set of paired pages consisting of one or more lower pages and an upper page. First storage unit 150 performs write operations in the unit of pages. For example, each MLC can have four programming states, wherein each programming state is represented by the two bits of data stored therein. A first one of the two bits of data stored therein is included in a lower page and a second one of the two bits of data is included in an upper page, the lower and upper pages being paired as a set.

Figure 2A:
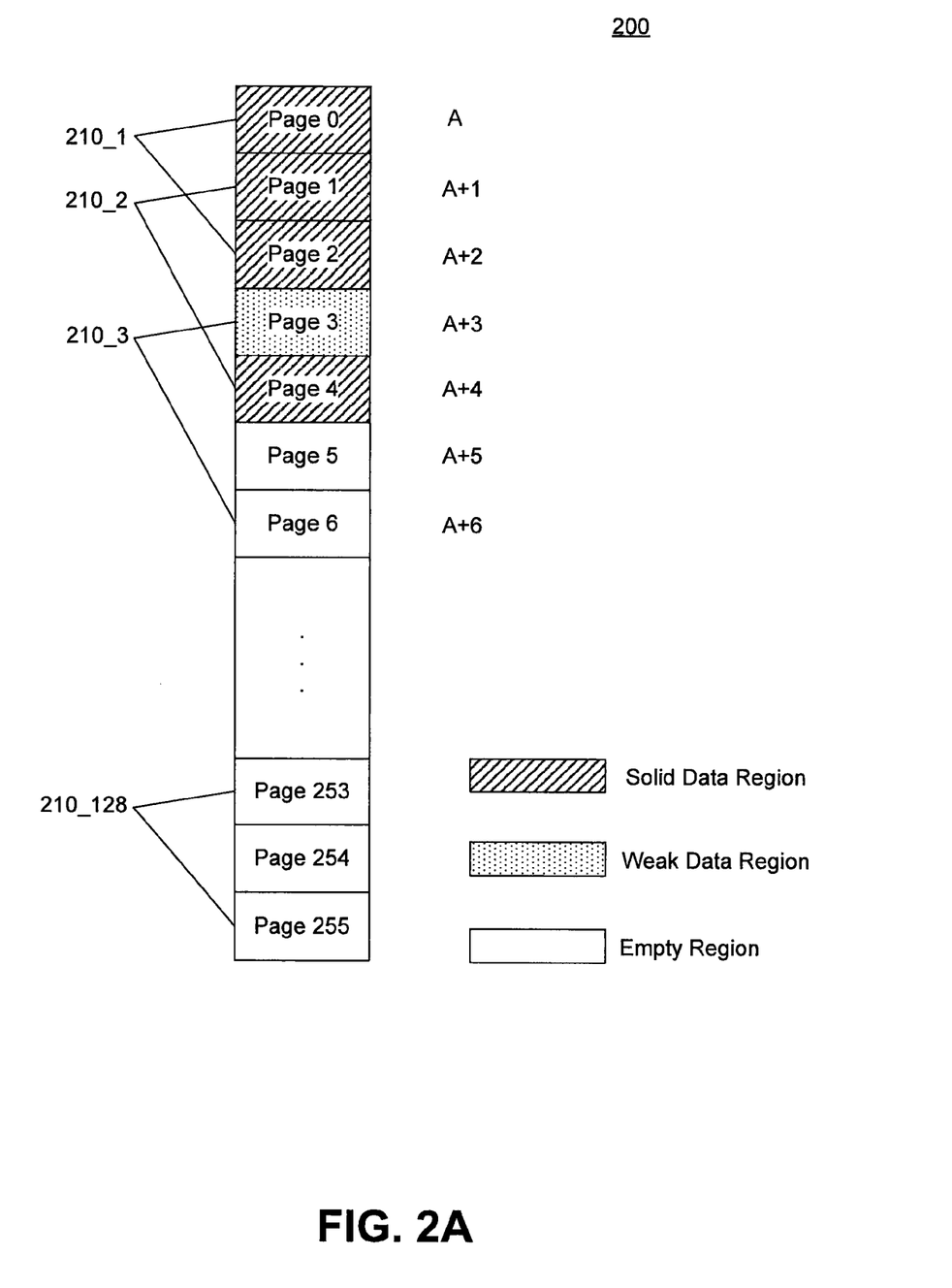
FIGS. 2A-2D schematically illustrate paired pages within a block of a NAND flash memory containing multi-level cells (MLCs), according to an exemplary embodiment.

FIGS. 2A-2D schematically illustrate paired pages within a block 200 of a NAND flash memory consisting of MLCs, according to an exemplary embodiment. As illustrated in FIG. 2A, block 200 includes 256 pages, namely, Page 0, Page 1, Page 2, . . . , and Page 255. The pages are paired with each other to form 128 sets of paired pages 210, namely, 210_1, 210_2, 210_3 . . . , 210_128. Each set of paired pages 210 includes a lower page and an upper page. For example, as illustrated in FIG. 2A, the set of paired pages 210_1 includes a lower page Page 0 and an upper page Page 2, and the set of paired pages 210_2 includes a lower page Page 1 and an upper page Page 4.

Generally, when writing data into memory cells, first storage unit 150 performs sequential writing of pages in the order of page numbers. That is, the memory sequentially writes data into Page 0, Page 1, Page 2, . . . , and Page 255. The data stored in the paired pages are related to each other. If a write operation for writing data into the upper page of a set of paired pages fails due to, for example, a power interruption, the data previously written to the lower page of the set of paired pages is probably damaged. Therefore, the data written into the lower page is risky since it will probably be damaged due to power interruption.

For example, referring to FIG. 2A, if a write operation for writing data into Page 2 (which is the upper page in the set of paired pages 210_1) fails, the data previously written into Page 0 (which is the lower page in the set of paired pages 210_1) is probably damaged. Only when the write operation for writing data into Page 2 is successfully completed, then the data previously written into Page 0 and the data written into Page 2 can be referred to as solid, i.e., is not damaged and cannot be damaged by failure of a subsequent write operation, e.g., a write operation for writing data into Page 3.

Hereinafter, data that can be damaged by power interruption is referred to as "risky data", and data that will not be damaged by power interruption is referred to as "solid data". The region in first storage unit 150 that stores the risky data is referred to as "weak data region 154." The region in first storage unit 150 that stores the solid data is referred to as "solid data region 152."

Figure 2B:
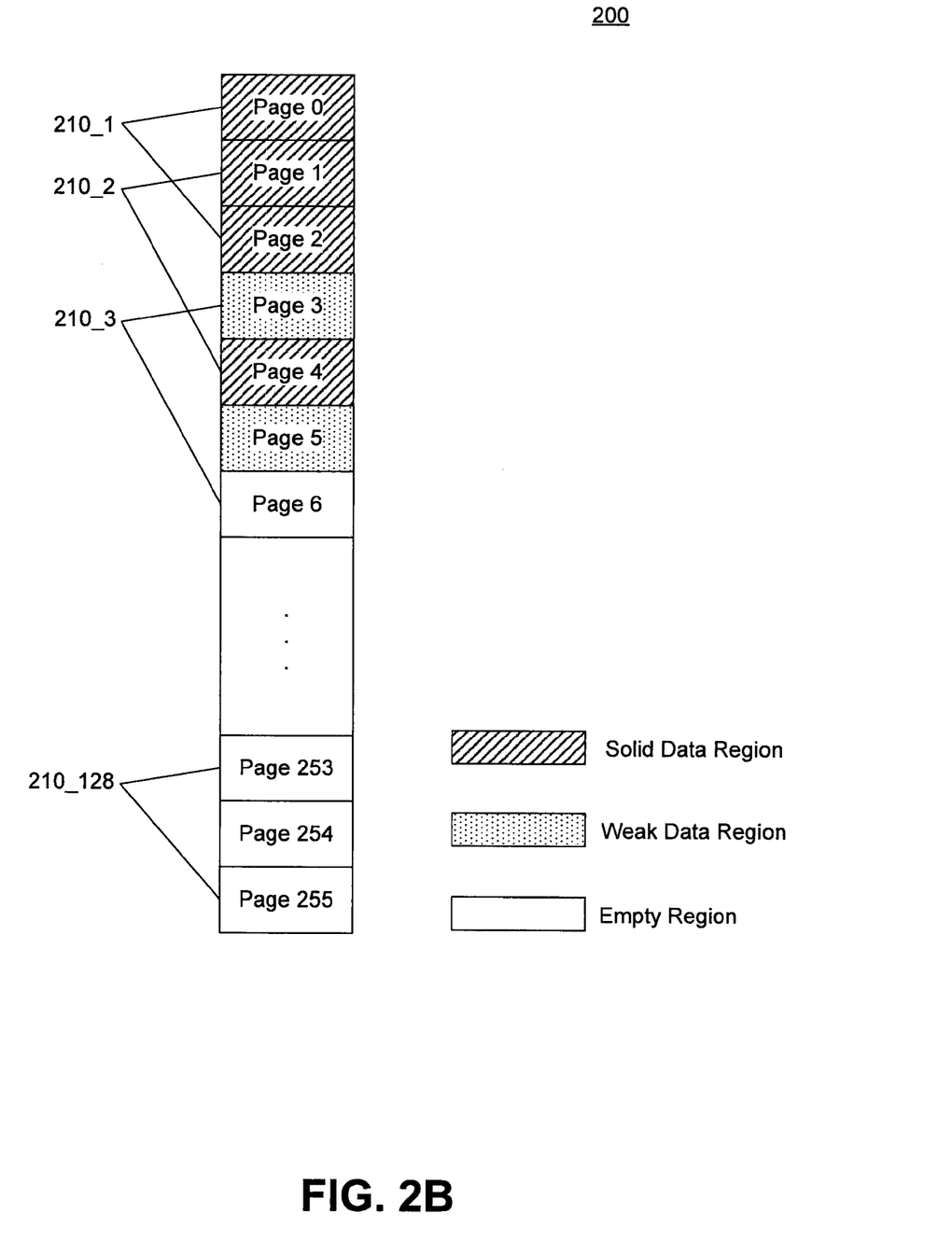
Figure 2C:
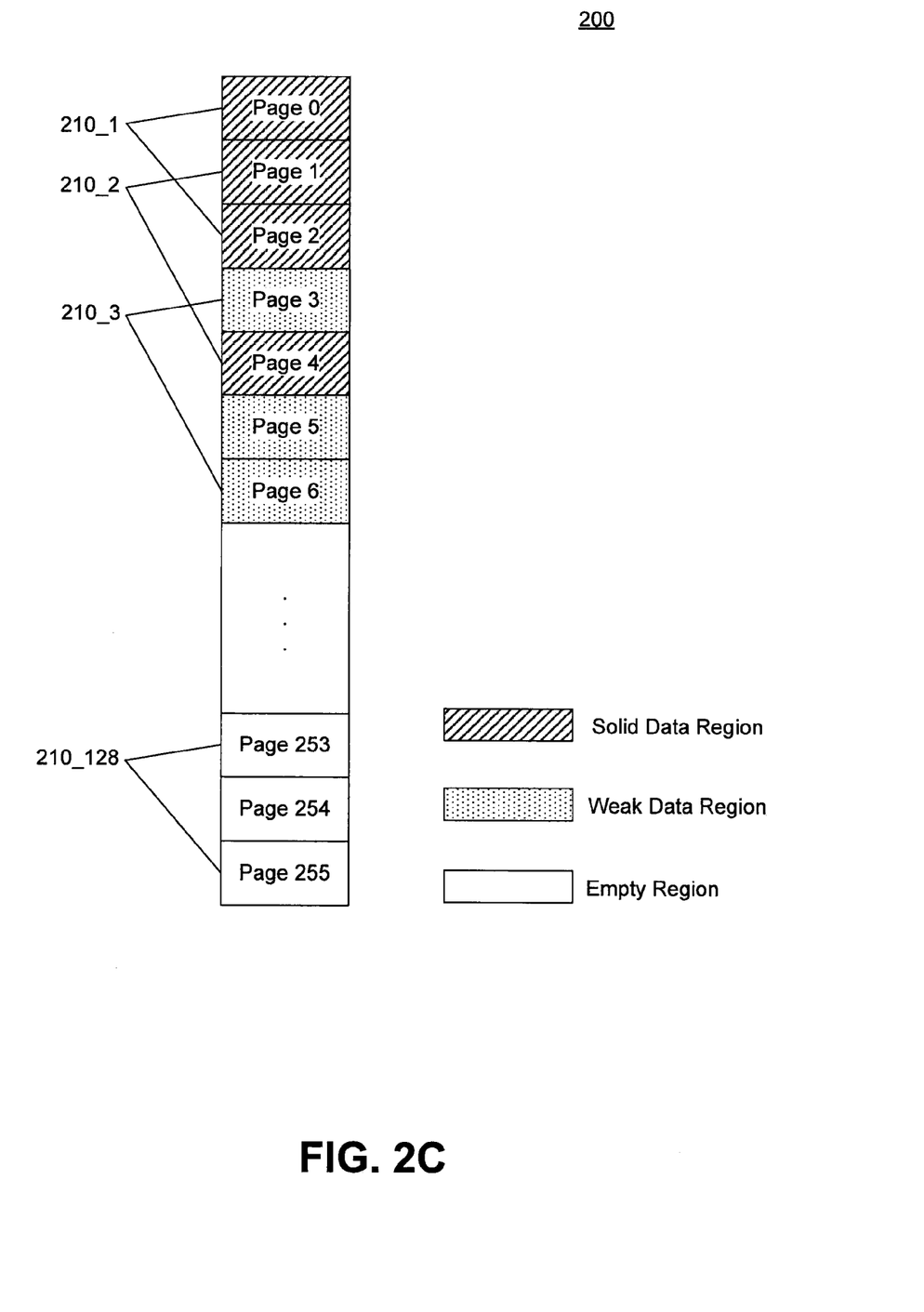
Figure 2D:
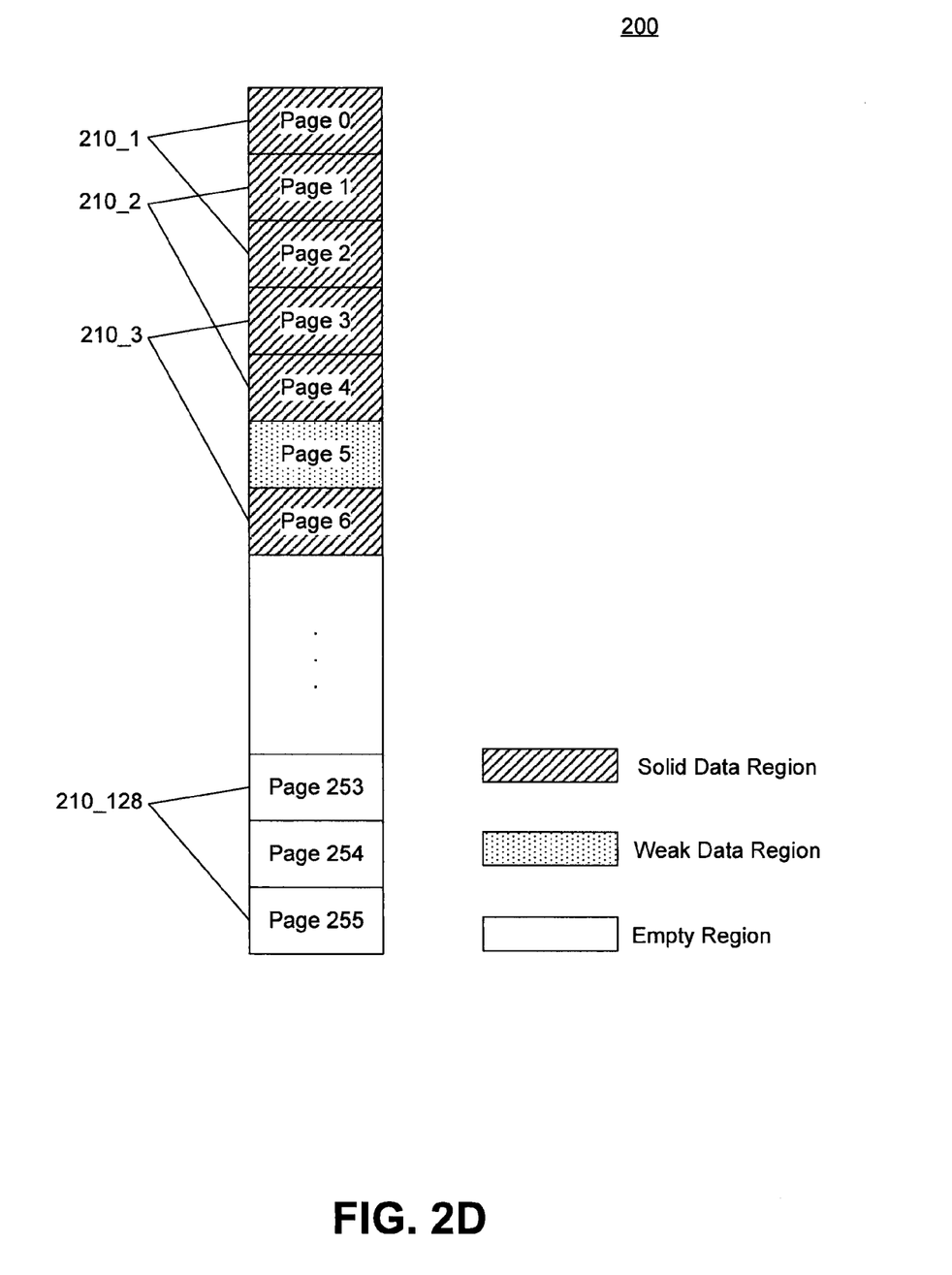

In the example illustrated in FIG. 2A, it is assumed that, initially, Page 0 through Page 4 have been successfully written with data, while Page 5 through Page 255 are empty. Then, Page 0, Page 1, Page 2, and Page 4 belong to solid data region 152, because the data stored thereon are solid data which will not be damaged by power interruption; and Page 3 belongs to weak data region 154, because the data stored thereon is risky data which will probably be damaged if a write operation for writing data into Page 6 with which Page 3 is paired, fails due to power interruption. Page 5 through Page 255 belong to an empty region where no data has been written. Then, as illustrated in FIG. 2B, Page 5 is written with data. Thus, Page 5 becomes part of weak data region 154. Afterwards, as illustrated in FIG. 2C, Page 6 is written with data. During the write operating for writing data into Page 6, Page 6 belongs to weak data region 154. When the write operation for writing data into Page 6 is successfully completed, as illustrated in FIG. 2D, both Page 3 and Page 6 become part of solid data region 152.

Figure 3:
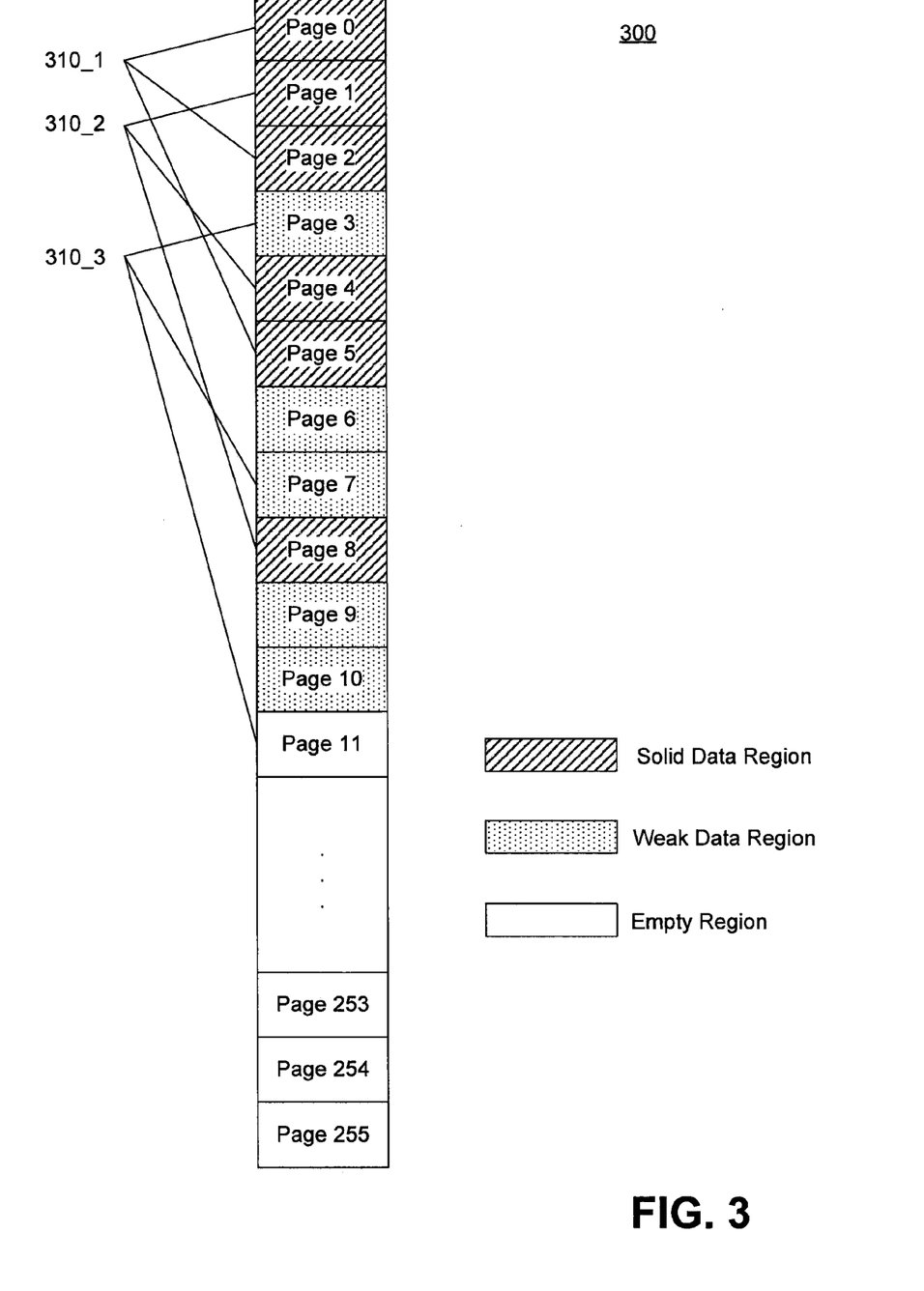
FIG. 3 schematically illustrates paired pages within a block of a NAND flash memory containing triple-level cells (TLCs), according to an exemplary embodiment.

In the example illustrated in FIGS. 2A-2D, each set of paired pages consists of two paired pages, i.e., a lower page and an upper page. Those skilled in the art will appreciate that each set of paired pages can include more than two paired pages. For example, FIG. 3 schematically illustrates paired pages within a block 300 of a NAND flash memory consisting of TLCs, according to an exemplary embodiment. As illustrated in FIG. 3, block 300 includes 256 pages, namely, Page 0, Page 1, Page 2, . . . , and Page 255. The pages are paired with each other to form a plurality of sets of paired pages 310, namely, 310_1, 310_2, 310_3 . . . . Each set of paired pages 310 includes two lower pages and one upper page. For example, as illustrated in FIG. 3, the set of paired pages 310_1 includes two lower pages Page 0 and Page 2, and an upper page Page 5. As another example, the set of paired pages 310_2 includes two lower pages Page 1 and Page 4, and an upper page Page 8. Only when the writing operations for writing data into the entire set of paired pages are successfully completed, the data stored in the set of paired pages can be solid, and the set of paired pages can become part of solid data region 152. In the example illustrated in FIG. 3, Page 0 through Page 10 has been successfully written with data, while Page 11 through Page 255 are empty. Then, Page 0, Page 1, Page 2, Page 4, Page 5, and Page 8 belong to solid data region 152, while Page 3, Page 6, Page 7, Page 9, and Page 10 belong to weak data region 154. If, in a next step (not illustrated), Page 11 is successfully written with data, then Page 3, Page 7, and Page 11 in the set of paired pages 310_3 become part of solid data region 152.

More generally, a set of paired pages can include N pages $P\_0, P\_1, \ldots, P\_N\text{-}1$, with N being a natural number greater than 1, pages $P\_0, P\_1, \ldots, P\_N\text{-}2$ are the lower pages in the set of paired pages, and page $P\_N\text{-}1$ is the upper page in the set. The number N of pages per set is equal to the number of bits stored in one memory cell. Thus, the upper page P_N-1 stores the Nth bit of the memory cell. The data stored in the set of paired pages are related to one another. Before a write operation for writing data into page P_N-1, which is the highest page in the set of paired pages is successfully completed, the data previously written into pages P_0, P_1, . . . , P_N-2 is risky, i.e., can be damaged by power interruption. Only when the write operation for writing data into page P_N-1 is successfully completed, the data written into pages P_0, P_1, . . . , P_N-1 is not risky, i.e., becomes solid.

Conventionally, whenever control unit 130 writes data associated with a logical address into first storage unit 150, control unit 130 immediately stores updated mapping information which relates the logical address to a new physical address at which the data is stored, into cached mapping table 146, and synchronizes the cached mapping table 146 with address mapping table 156 according to a synchronized strategy. If the data stored at the new physical address in first storage unit 150 is risky, then, when the power supplied to memory device 120 is interrupted, the data is probably damaged. If the data is damaged, when the power is restored and host 110 sends out a read command to read data associated with the logical address, control unit 130 obtains the updated mapping information from address mapping table 156, translates the logical address into the new physical address according to the updated mapping information, and attempts to read data from the new physical address. However, because the data stored at the new physical address has been damaged, control unit 130 cannot read any data at the new physical address. In such case, control unit 130 would need to spend a relatively long time to search for old mapping information which relates the logical address with to an old physical address, and then read data at the old physical address. The relatively long time could reduce a power up speed.

On the other hand, in the embodiments of the present disclosure, second storage unit 140 stores risky mapping table 144. Whenever control unit 130 writes data into buffer data region 142 or first storage unit 150, control unit 130 stores the updated mapping information in risky mapping table 144, and stores the mapping information stored in risky mapping table 144 into cached mapping table 145 only when the data written into first storage unit 150 becomes solid. In such way, even if the data written into first storage unit 150 is damaged due to power interruption, control unit 130 can read data having a solid status from first storage unit 150 using old mapping information stored in address mapping table 156.

Figure 4:
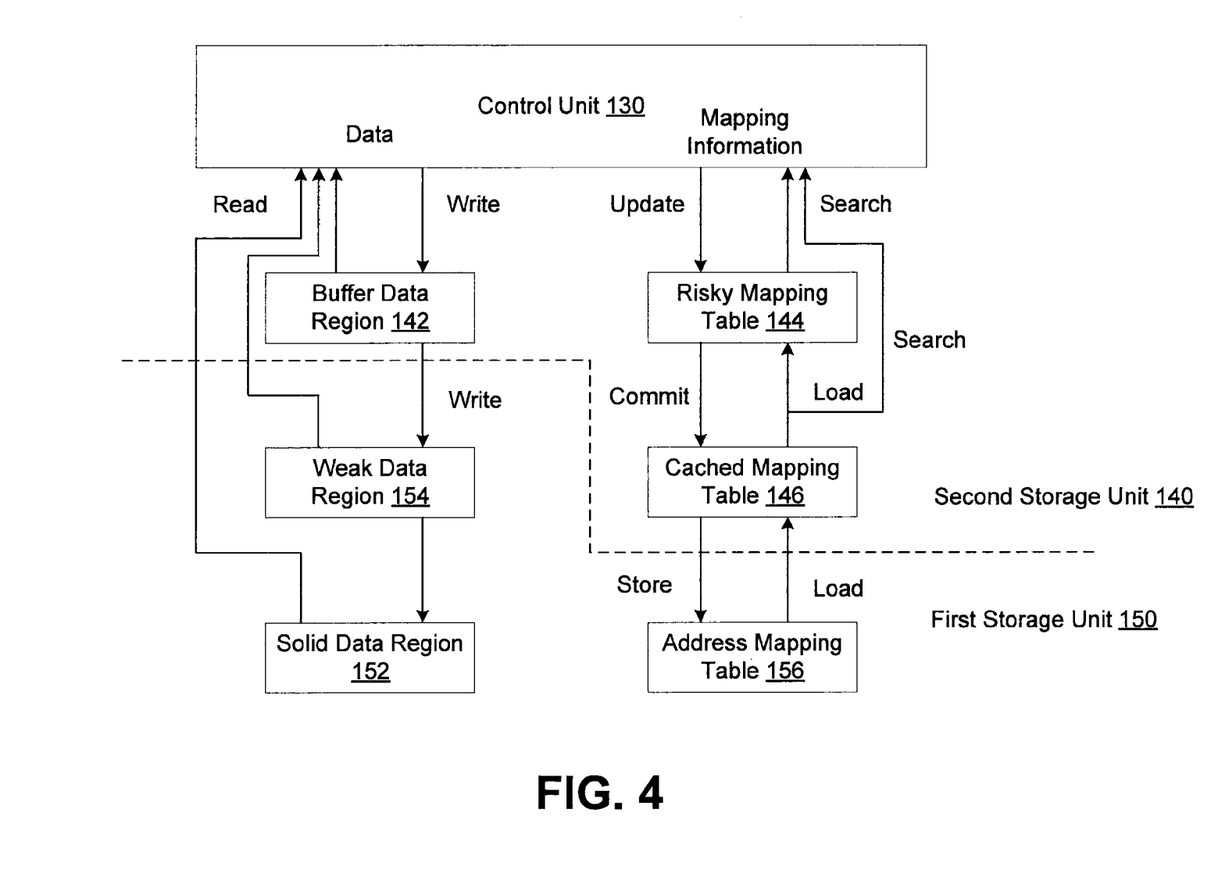
FIG. 4 schematically illustrates flows of data and mapping information in a first storage unit and a second storage unit of the memory device of FIG. 1, according to an illustrated embodiment.

FIG. 4 schematically illustrates flows of data and mapping information in second storage unit 140 and first storage unit 150 of memory device 120 of FIG. 1, according to an illustrated embodiment. The flows of data and mapping information can be controlled by control unit 130.

Referring to FIG. 4, during a write operation, control unit 130 can write data received from host 110 into buffer data region 142. Because the data stored in the buffer data region 142 can be damaged or lost due to power interruption, the data stored in the buffer data region 142 is risky data. Control unit 130 can also write data in buffer data region 142 into weak data region 154. If control unit 130 determines that the data has been written into an upper page of a set of paired pages, i.e., the entire set of paired pages has been written with data, then the set of paired pages where the data has been written becomes part of solid data region 152.

During a read operation, control unit 130 can read data from buffer data region 142, weak data region 154, or solid data region 152.

When control unit 130 needs to access first storage unit 150 for reading data or writing data associated with a logical address, control unit 130 obtains mapping information corresponding to the logical address. Control unit 130 can search for mapping information corresponding to the logical address in risky mapping table 144. Control unit 130 can also search for mapping information corresponding to the logical address in cached mapping table 146. Once control unit 130 finds the mapping information in cached mapping table 146, control unit 130 can load the mapping information from cached mapping table 146 into risky mapping table 144. If control unit 130 cannot find the mapping information in cached mapping table 146, control unit 130 can load part of the mapping information stored in address mapping table 156 into cached mapping table 146, and search for the mapping information corresponding to the logical address in cached mapping table 146.

When control unit 130 needs to update mapping information after a write operation, control unit 130 can perform an update operation to update the mapping information in risky mapping table 144. When risky data becomes solid, the mapping information in risky mapping table 144 and related to the risky data that becomes solid is stored into cache mapping table 146. Hereinafter, the operation of storing the mapping information in risky mapping table 144 into cached mapping table 146 is referred to herein as a "commit" operation. In addition, control unit 130 can store the mapping information stored in cached mapping table 146 into address mapping table 156 according to a certain synchronization strategy. For example, control unit 130 can periodically perform the store operation to store the mapping information in cached mapping table 146 into address mapping table 156.

Figure 5:
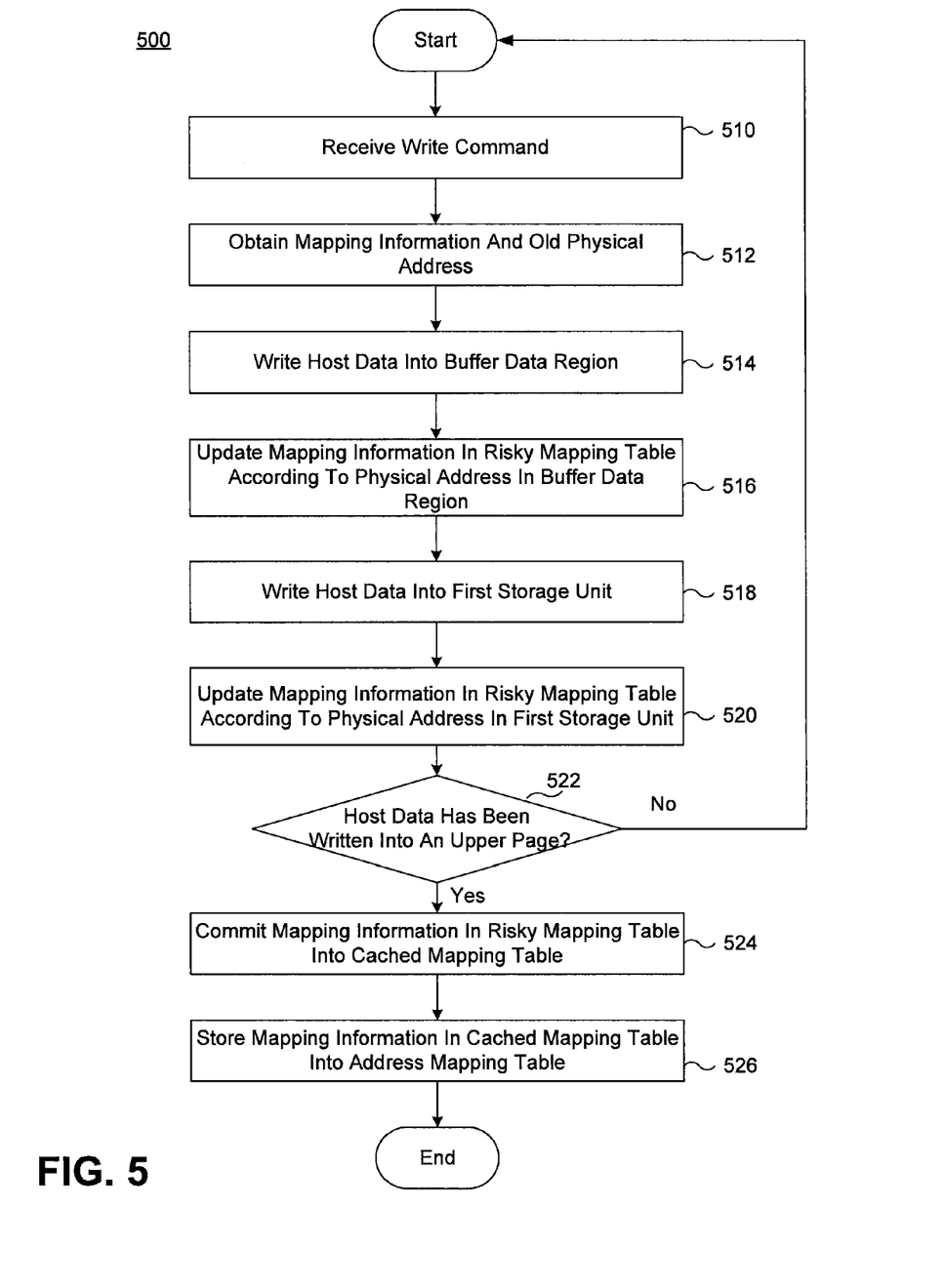
FIG. 5 is a flowchart illustrating a process of a write operation performed by a control unit, according to an illustrated embodiment.

FIG. 5 is a flowchart illustrating a process 500 of a write operation performed by control unit 130, according to an illustrated embodiment. Referring to FIG. 5, control unit 130 receives a write command from host 110 (step 510). The write command includes data received from host 110 and to be written into first storage unit 150 (hereinafter referred to as "host data") and a logical address associated with the host data.

Control unit 130 obtains mapping information corresponding to the logical address associated with the host data (step 512). The mapping information indicates a mapping relationship between the logical address and a physical address (hereinafter referred to as the "old physical address" associated with the host data). In order to obtain the mapping information, control unit 130 first searches for the mapping information corresponding to the logical information in risky mapping table 144. If control unit 130 cannot find the mapping information in risky mapping table 144, control unit 130 searches for the mapping information in cached mapping table 146. If control unit 130 finds the mapping information in cached mapping table 146, control unit 130 stores the mapping information into risky mapping table 144. If control unit 130 cannot find the mapping information in cached mapping table 146, control unit 130 stores part of the mapping information stored in address mapping table 156 into cached mapping table 146, searches for the mapping information in cached mapping table 146, and stores the mapping information into risky mapping table 144. Once control unit 130 obtains the mapping information, control unit 130 translates the logical address into the old physical address according to the mapping information.

Control unit 130 writes the host data into buffer data region 142 of second storage unit 140 (step 514). As described above, buffer data region 142 is a region that temporarily stores data to be written into first storage unit 150.

After writing the host data into buffer data region 142, control unit 130 updates the mapping information in risky mapping table 144 according to a physical address of the host data in buffer data region 142 (step 516). When updating the mapping information, control unit 130 changes the old physical address related to the logical address associated with the host data in risky mapping table 144 to be consistent with the physical address of the host data in buffer data region 142.

Control unit 130 writes the host data stored in buffer data region 142 into first storage unit 150 (step 518). In some embodiments, at step 518, control unit 130 additionally performs a pre-read operation and/or a post-read operation to read data (hereinafter referred to as "pre-read data" and "post-read data") from first storage unit 150, if the size and the old physical address associated with the host data do not align with a granularity (i.e., the smallest mapping size) of address mapping. If there is any pre-read data or post-read data obtained from the pre-read operation or post-read operation, control unit 130 also writes the pre-read data and/or post-read data into first storage unit 150. Control unit 130 writes the host data into the first empty page in first storage unit 150. The empty page is a page in which data is not stored. Control unit 130 obtains a new physical address associated with the host data, the new physical address indicating the address in first storage unit 150 where the host data is written. Control unit 130 also generates updated mapping information associated with the new physical address of the host data, the updated mapping information indicating a mapping relationship between the logical address and the new physical address associated with the host data.

At step 518, control unit 130 also writes metadata associated with the host data into first storage unit 150. The metadata includes the updated mapping information associated with the host data, and a sequence number associated with the updated mapping information. The sequence number is assigned by control unit 130 to indicate the sequence of generating the updated mapping information when writing data into first storage unit 150. The greater the sequence number, the more recent the updated mapping information has been generated. In the example illustrated in FIG. 2A, if the sequence number associated with the mapping information generated when writing data into Page 0 is A, where A is a natural number, then the sequence number associated with the mapping information generated when writing data into Page 1 is A+1, and the sequence number associated with the mapping information generated when writing data into Page 2 is A+2, and so on.

Control unit 130 updates the mapping information in risky mapping table 144 according to the updated mapping information associated with the host data (step 520). When updating the mapping information, control unit 130 changes the physical address related to the logical address associated with the host data in risky mapping table 144, which represents the physical address of the host data in buffer data region 142, to be consistent with the new physical address of the host data in first storage unit 150. For example, control unit 130 removes the mapping relationship between the logical address and the physical address of the host data in buffer data region 142, and adds a mapping relationship between the logical address and the new physical address of the host data in first storage unit 150. At step 520, control unit 130 also stores the sequence number associated with the updated mapping information into risky mapping table 144.

Control unit 130 then determines whether the host data has been written into an upper page of a set of paired pages in first storage unit 150 (step 522). Control unit 130 makes the determination based on the new physical address of the host data in first storage unit 150. If the new physical address is the address of an upper page in a set of paired pages, control unit 130 determines that the host data has been written into the upper page of the set of paired pages in first storage unit 150 (step 522: Yes). In such case, the host data that has been written into first storage unit 150, as well as the data that has been previously written into one or more lower pages in the same set of paired pages, becomes solid and will not be damaged by power interruption. In the example illustrated in FIG. 2A, if the host data has been written into Page 4, which is the upper page of the set of paired pages 210_2, then the host data in Page 4 as well as the data that was previously written into Page 1, becomes solid.

On the other hand, if the new physical address of the host data in first storage unit 150 is the address of any one of the lower pages in a set of paired pages, control unit 130 determines that the host data has not been written into the upper page of the set of paired pages (step 522: No). In such case, the host data that has been written into first storage unit 150 is risky and can probably be damaged due to power interruption. In the example illustrated in FIG. 2A, if the host data has been written into Page 3, which is the lower page in the set of paired pages 210_3, then the host data that has been written into Page 3 is risky. When control unit 130 determines that the host data has not been written into an upper page of a set of paired pages, control unit 130 returns to the start of process 400, to wait for another command from host 110, such as a read command, an erase command, or another write command. In other words, if the host data that has been written into first storage unit 150 is risky, control unit 130 does not commit the mapping information stored in risky mapping table 144 into cached mapping table 146, as more fully described below.

When control unit 130 determines that the host data has been written into an upper page in a set of paired pages (step 522, Yes), control unit 130 commits the mapping information stored in risky mapping table 144 and associated with the data stored in the same set of paired pages as the host data into cached mapping table 146 (step 524). That is, control unit 130 commits the mapping information that includes not only the mapping information associated with the newly written host data, but also the mapping information associated with the data that has been written into the same set of the paired pages as the newly written host data. In the example illustrated in FIG. 2A, if the host data was written into Page 4 at step 518, control unit 130 commits the mapping information associated with the host data in Page 4 and the mapping information associated with the data in Page 1 into cached mapping table 146. When committing the mapping information stored in risky mapping table 144 into cached mapping table 146, control unit 130 changes the mapping information in cached mapping table 146 to be consistent with the mapping information in risky mapping table 144. Specifically, if the mapping information stored in risky mapping table 144 includes mapping relationships between a set of logical addresses and a set of physical addresses, control unit 130 removes old mapping information corresponding to the set of logical addresses from cached mapping table 146, and stores the mapping information corresponding to the set of logical addresses stored in risky mapping table 144 to cached mapping table 146.

When committing the mapping information stored in risky mapping table 144 into cached mapping table 146 at step 524, control unit 130 selects a lowest sequence number from the sequence numbers associated with the committed mapping information, and stores the selected sequence number into cached mapping table 146. In the example illustrated in FIG. 2A, assuming that the sequence number associated with the mapping information of data written into Page 1 is A+1 and the sequence number associated with the mapping information of data written into Page 4 is A+4, where A is a natural number, then control unit 130 selects the sequence number A+1 and stores it into cached mapping table 146 when committing the mapping information associated with the data in Page 1 and Page 4 into cached mapping table 146.

Control unit 130 stores mapping information in cached mapping table 146 into address mapping table 156 according to a synchronization strategy (step 526). For example, according to a certain synchronization strategy, control unit 130 periodically stores the mapping information in cached mapping table 146 into address mapping table 156. When storing the mapping information from cached mapping table 146 to address mapping table 156, control unit 130 changes the mapping information in address mapping table 156 to be consistent with the mapping information in cached mapping table 146, in a manner similar to step 524. When storing the mapping information in cached mapping table 146 into address mapping table 156, control unit 130 also stores the sequence number stored in cached mapping table 146 into address mapping table 156. After step 526, process 400 ends.

Figure 6:
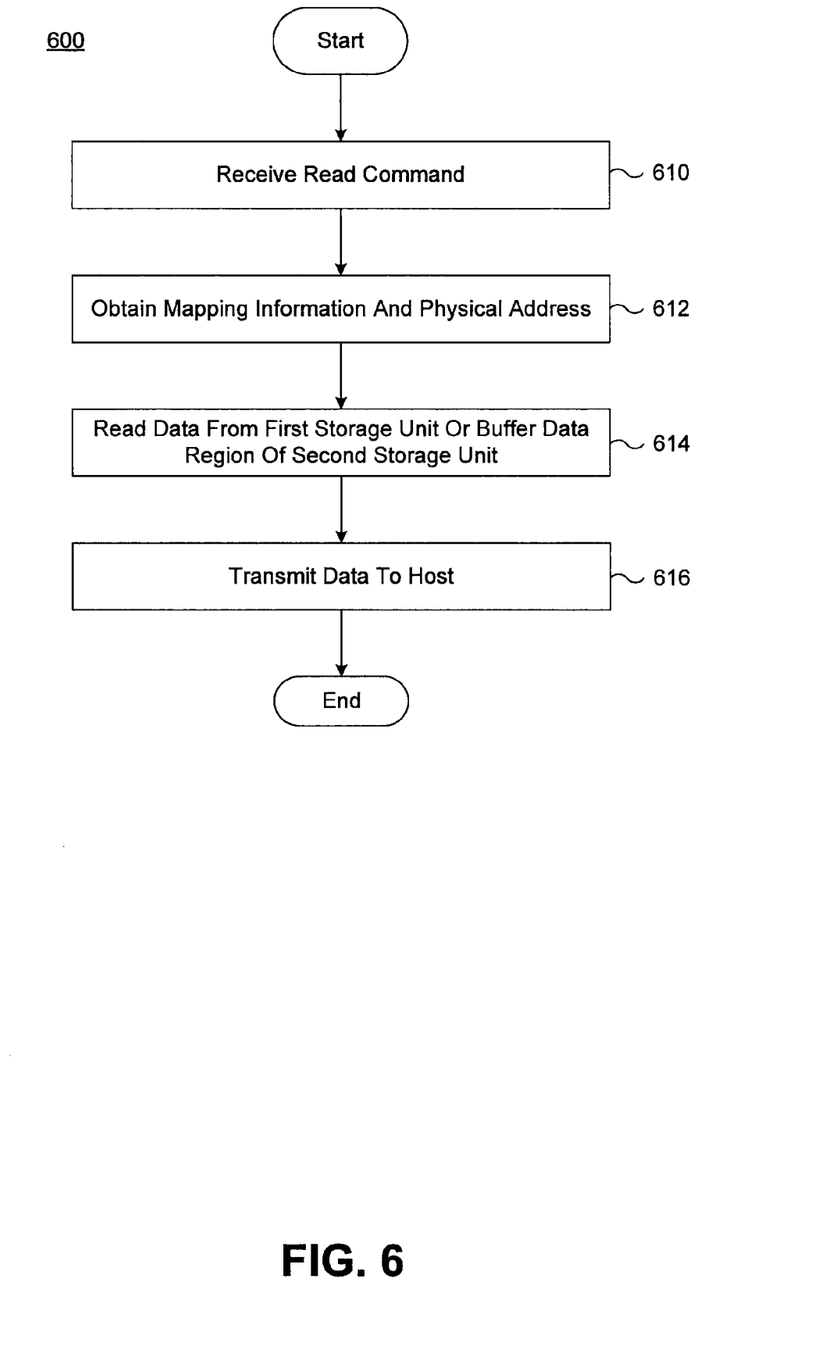
FIG. 6 is a flowchart illustrating a process of a read operation performed by a control unit, according to an illustrated embodiment.

FIG. 6 is a flowchart illustrating a process 600 of a read operation performed by control unit 130, according to an illustrated embodiment. Referring to FIG. 6, control unit 130 receives a read command from host 110 (step 610). The read command includes a logical address associated with the data to be read.

Control unit 130 obtains mapping information corresponding to the logical address associated with the data to be read and obtains a physical address mapped to the logical address (step 612). In order to obtain the mapping information, control unit 130 first searches for the mapping information corresponding to the logical information in risky mapping table 144. If control unit 130 cannot find the mapping information in risky mapping table 144, control unit 130 searches for the mapping information in cached mapping table 146. If control unit 130 cannot find the mapping information in cached mapping table 146, control unit 130 stores part of the mapping information stored in address mapping table 156 into cached mapping table 146, and again searches for the mapping information in cached mapping table 146. Once control unit 130 obtains the mapping information, control unit 130 translates the logical address into the physical address according to the mapping information. The physical address represents the location of the data to be read, and the location can be either first storage unit 150 or buffer data region 142.

Control unit 130 then reads data from first storage unit 150 or buffer data region 142 according to the physical address obtained at step 612 (step 614). If the mapping information was found by control unit 130 in risky mapping table 144, indicating that the data to be read is risky data, control unit 130 reads the data from weak data region 154 of first storage unit 150 or from buffer data region 142. If the mapping information was found by control unit 130 in cached mapping table 146 or address mapping table 156, indicating that the data to be read is solid data, control unit 130 reads the data from solid data region 152. If control unit 130 reads data from first storage unit 150, control unit 130 temporarily stores the data read from first storage unit 150 into buffer data region 142.

After reading data, control unit 130 transmits to host 110 (step 616). Then, process 600 ends.

As described above, second storage unit 140 can be provided as a volatile memory or a non-volatile memory. In some cases, the data, such as risky mapping table 144, stored in second storage unit 140 may be damaged. For example, if second storage unit 140 is a volatile memory, the data stored in second storage unit 140 can be damaged due to power interruption. If second storage unit 140 is a non-volatile memory, the data stored in second storage unit 140 can be damaged due to abnormal power loss that occurred in second storage unit 140. If risky mapping table 144 stored in second storage unit 140 is damaged, risky mapping table 144 can be rebuilt based on the information stored in first storage unit 150.

Figure 7:
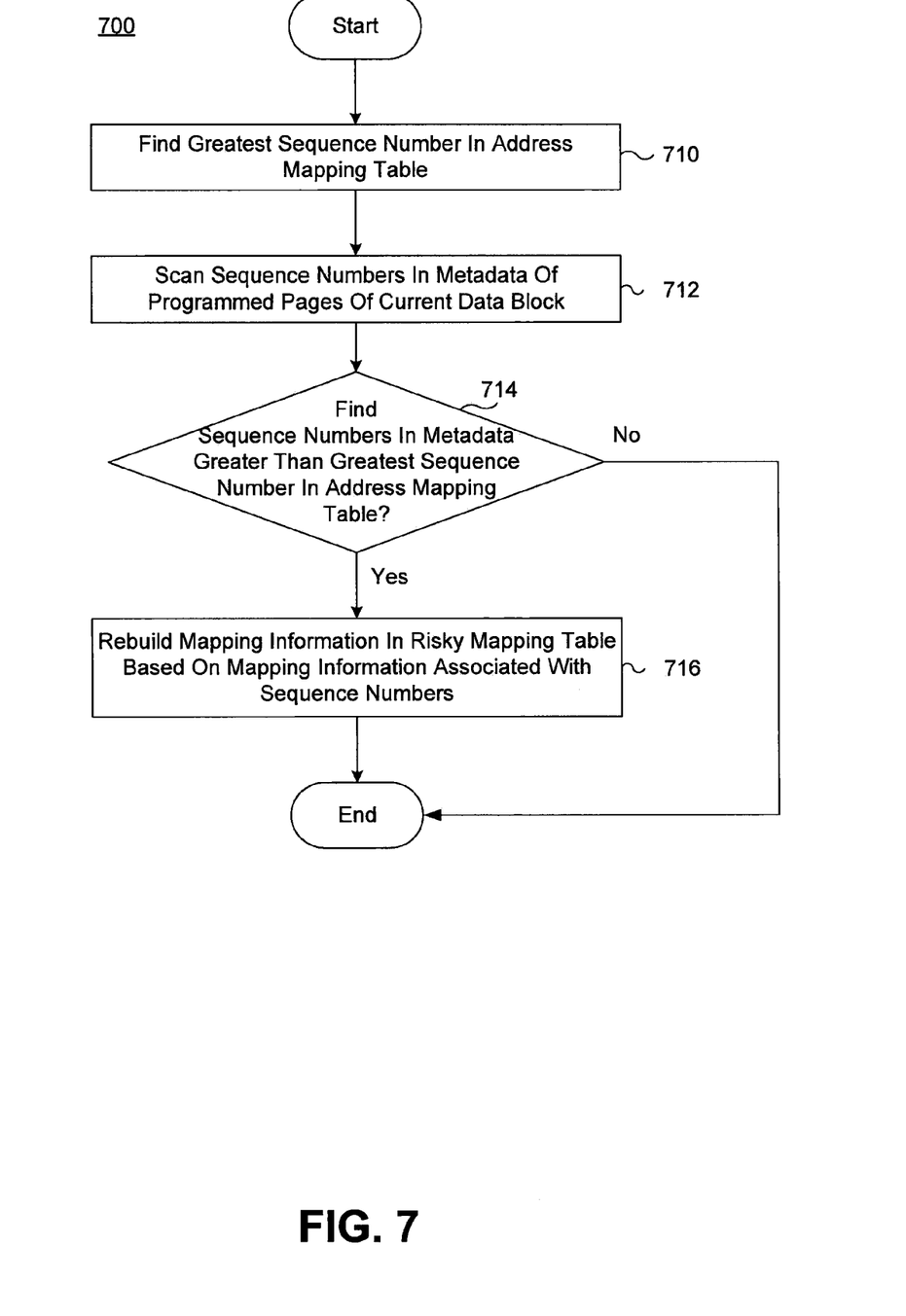
FIG. 7 is a flowchart illustrating a process of rebuilding a risky mapping table after power interruption, according to an illustrated embodiment.

FIG. 7 is a flowchart illustrating a process 700 of rebuilding risky mapping table 144, according to an illustrated embodiment. Referring to FIG. 7, when control unit 130 determines that the data stored in second storage unit 140 is damaged, control unit 130 finds a greatest sequence number in address mapping table 156 (step 710). In one embodiment, control unit 130 determines that the data stored in second storage unit 140 is damaged when power of system 100 is restored following a power interruption. In another embodiment, control unit 130 determines that the data stored in second storage unit 140 is damaged when abnormal power loss occurs in second storage unit 140.

Control unit 130 then scans a plurality of sequence numbers included in the metadata associated with the data stored in a current data block of first storage unit 150 (step 712). The current data block is the data block where control unit 130 last stored data prior to the power interruption. As described previously, when control unit 130 writes the host data into first storage unit 150, control unit 130 also writes the metadata associated with the host data into first storage unit 150. The metadata includes mapping information associated with the host data and a sequence number associated with the mapping information.

Control unit 130 determines whether it finds any sequence number included in the metadata that is greater than the greatest sequence number in address mapping table 156 (step 714). If there are one or more sequence numbers greater than the greatest sequence number in address mapping table 156 (step 714: Yes), control unit 130 determines that address mapping table 156 has not been updated with the mapping information associated with the one or more sequence numbers. In other words, the mapping information associated with the one or more sequence numbers has not been stored into address mapping table 156. In such case, control unit 130 rebuilds risky mapping table 144 based on the mapping information included in the metadata stored in first storage unit 150 and associated with the one or more sequence numbers that are greater than the greatest sequence number in address mapping table 156 (step 716). Control unit 130 rebuilds risky mapping table 144 by copying the mapping information included in the metadata and associated with the one or more sequence numbers; and storing the copied mapping information into risky mapping table 144.

If there is no sequence number included in the metadata that is greater than the greatest sequence number in address mapping table 156 (step 714: No), control unit 130 determines that all of the mapping information in address mapping table 156 is updated. Therefore, control unit 130 decides not to rebuild mapping information in risky mapping table 144. Thus, process 700 ends.

In the above-disclosed embodiments, control unit 130 stores updated mapping information associated with data written into first storage unit 150 into risky mapping table 144, and stores the mapping information stored in risky mapping table 144 to cached mapping table 145 only when the data written into first storage unit 150 becomes solid. In such way, the mapping information stored in address mapping table 156 is always consistent with the solid data stored in first storage unit 150. Then, even if the data written into first storage unit 150 is damaged due to power interruption, control unit 130 can read data from first storage unit 150 using old mapping information stored in address mapping table 156.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A memory device, comprising:
a first storage unit storing an address mapping table;
a control unit coupled to the first storage unit and including a second storage unit storing a risky mapping table and a cached mapping table, wherein the risky mapping table stores mapping information of risky data, the risky data being data that can be damaged by power interruption;
wherein the control unit is configured to:
write data into the first storage unit;
update mapping information associated with the data in the risky mapping table;
when the data has been written into an upper page in a set of paired pages in the first storage unit, commit mapping information that is in the risky mapping table and that is associated with the data into the cached mapping table; and
store mapping information in the cached mapping table into the address mapping table.

2. The memory device of claim 1, wherein the control unit is further configured to:
receive a write command from a host, the write command including data to be written into the first storage unit and a logical address associated with the data;
obtain mapping information corresponding to the logical address; and
translate the logical address into a physical address according to the mapping information.

3. The memory device of claim 2, wherein the control unit is further configured to:
perform a pre-read operation or a post-read operation based on the physical address and the size of the host data.

4. The memory device of claim 1, wherein the control unit is configured to, in response to a read command including a logical address:
obtain mapping information corresponding to the logical address;
translate the logical address into a physical address; and
read data from the first storage unit according to the physical address.

5. The memory device of claim 1, wherein the control unit is further configured to, when receiving a command including a logical address, obtain mapping information corresponding to the logical address by:
searching for the mapping information corresponding to the logical address in the risky mapping table;
if the mapping information is not stored in the risky mapping table, searching for the mapping information corresponding to the logical address in the cached mapping table and, if the mapping information is stored in the cached mapping table, loading the mapping information from the cached mapping table into the risky mapping table; and
if the mapping information is not stored in the cached mapping table, loading part of the mapping information that is stored in the address mapping table into the cached mapping table, searching for the mapping information corresponding to the logical address in the cached mapping table, and, if the mapping information is stored in the cached mapping table, loading the mapping information from the cached mapping table into the risky mapping table.

6. The memory device of claim 1, wherein the control unit is further configured to:
assign a sequence number to be associated with the updated mapping information of the host data;
write metadata associated with the host data into the first storage unit, the metadata including the updated mapping information associated with the host data and the sequence number associated with the updated mapping information; and
store the sequence number associated with the updated mapping information into the risky mapping table.

7. The memory device of claim 6, wherein the control unit is configured to:
when committing the mapping information that is in the risky mapping table and that is associated with data into the cached mapping table, select a lowest sequence number from the sequence numbers associated with the mapping information committed into the cached mapping table, and store the lowest sequence number into the cached mapping table; and
when storing the mapping information in the cached mapping table into the address mapping table, store the sequence number stored in the cached mapping table into the address mapping table.

8. The memory device of claim 7, wherein the control unit in further configured to, after power has been restored following a power interruption:
find a greatest sequence number in the address mapping table;
scan sequence numbers included in the metadata associated with the data stored in a current data block of the first storage unit to find one or more sequence numbers that are greater than the greatest sequence number in the address mapping table; and
rebuild the risky mapping table based on the mapping information associated with the one or more sequence numbers included in the metadata.

9. The memory device of claim 1, wherein the control unit is further configured to:
determine whether the data has been written into an upper page in a set of paired pages in the first storage unit based on the physical address of the data in the first storage unit.

10. A method for controlling a memory device by a control unit, the memory device including a first storage unit, the control unit including a second storage unit, the method comprising:

writing data into the first storage unit;

updating mapping information associated with the data in a risky mapping table included in the second storage unit, wherein the risky mapping table stores mapping information of risky data, the risky data being data that can be damaged by power interruption;

when the data has been written into an upper page in a set of paired pages in the first storage unit, committing mapping information that is in the risky mapping table and that is associated with the data into a cached mapping table included in the second storage unit; and storing mapping information in the cached mapping table included in the second storage unit into an address mapping table included in the first storage unit.

11. The method of claim 10, further comprising:

receiving a write command from a host, the write command including data to be written into the first storage unit and a logical address associated with the data; and obtaining mapping information corresponding to the logical address; and translating the logical address into a physical address according to the mapping information.

12. The method of claim 10, further comprising, when receiving a command including a logical address, obtaining mapping information corresponding to a logical address by:

searching for the mapping information corresponding to the logical address in the risky mapping table;

if the mapping information is not stored in the risky mapping table, searching for the mapping information corresponding to the logical address in the cached mapping table and, if the mapping information is stored in the cached mapping table, loading the mapping information from the cached mapping table into the risky mapping table; and if the mapping information is not stored in the cached mapping table, loading part of the mapping information that is stored in the address mapping table into the cached mapping table, searching for the mapping information corresponding to the logical address in the cached mapping table, and, if the mapping information is stored in the cached mapping table, loading the mapping information from the cached mapping table into the risky mapping table.

13. The method of claim 11, further comprising:

performing at least one of a pre-read operation or a post-read operation based on the physical address and the size of the host data.

14. The method of claim 10, the method further comprising:

in response to a read command including a logical address, obtaining mapping information corresponding to the logical address;

translating the logical address into a physical address; and reading data from the first storage unit according to the physical address.

15. The method of claim 10, further comprising:

assigning a sequence number to be associated with the updated mapping information of the host data;

when writing the host data into the first storage unit, writing metadata associated with the host data into the first storage unit, the metadata including the updated mapping information associated with the host data and the sequence number associated with the updated mapping information; and storing the sequence number associated with the updated mapping information into the risky mapping table.

16. The method of claim 15, further comprising:

when committing the mapping information that is in the risky mapping table and that is associated with data into the cached mapping table, selecting a lowest sequence number from the sequence numbers associated with the mapping information committed into the cached mapping table, and storing the lowest sequence number into the cached mapping table; and when storing the mapping information in the cached mapping table into the address mapping table, storing the sequence number stored in the cached mapping table into the address mapping table.

17. The method of claim 16, further comprising:

determining that data in the second storage unit is damaged;

finding a greatest sequence number in the address mapping table;

scanning sequence numbers included in the metadata associated with the data stored in a current data block of the first storage unit to find one or more sequence numbers that are greater than the greatest sequence number in the address mapping table; and rebuilding the risky mapping table based on the mapping information included in the metadata and associated with the one or more sequence numbers that are greater than the greatest sequence number in the address mapping table.

18. The method of claim 10, further comprising:

determining whether the data has been written into an upper page in a set of paired pages in the first storage unit based on the physical address of the data in the first storage unit.

* * * * *